US010434889B2

United States Patent
Buehs et al.

(10) Patent No.: US 10,434,889 B2
(45) Date of Patent: Oct. 8, 2019

(54) CHARGING DEVICE FOR AN ELECTRICALLY CHARGEABLE VEHICLE

(71) Applicant: SIEMENS MOBILITY GMBH, Munich (DE)

(72) Inventors: Florian Buehs, Berlin (DE); Andreas Laske, Berlin (DE); Andre Rompe, Berlin Kaulsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 193 days.

(21) Appl. No.: 15/325,575

(22) PCT Filed: Jul. 3, 2015

(86) PCT No.: PCT/EP2015/065172
§ 371 (c)(1),
(2) Date: Jan. 11, 2017

(87) PCT Pub. No.: WO2016/008739
PCT Pub. Date: Jan. 21, 2016

(65) Prior Publication Data
US 2017/0158074 A1    Jun. 8, 2017

(30) Foreign Application Priority Data

Jul. 16, 2014 (DE) .................. 10 2014 213 831

(51) Int. Cl.
*H02J 7/00* (2006.01)
*B60L 11/18* (2006.01)
(Continued)

(52) U.S. Cl.
CPC ............. *B60L 11/1827* (2013.01); *B60L 5/36* (2013.01); *B60L 53/16* (2019.02); *B60L 53/30* (2019.02);
(Continued)

(58) Field of Classification Search
CPC .............. B60L 11/1827; B60L 11/1818; B60L 11/1837; B60L 5/36; H02J 7/0027; H02J 7/0045
(Continued)

(56) References Cited

U.S. PATENT DOCUMENTS 3,955,657 A    5/1976    Bossi
4,158,802 A    6/1979    Rose, II
(Continued)

FOREIGN PATENT DOCUMENTS

DE    4404331 A1    8/1995
EP    2014505 A1    1/2009
(Continued)

OTHER PUBLICATIONS

Brave Creative Peterborough; "Towards electromobility Gothenburg's plug-in hybrid experience and beyond"; Bus & Coach Buyer; URL:http://www.busandcoachbuyer.com/towards-electromobility-gothenburgs-plug-hybrid-experience-beyond/; XP055211134; 2014.
(Continued)

*Primary Examiner* — Robert Grant
*Assistant Examiner* — John T Trischler
(74) *Attorney, Agent, or Firm* — Laurence Greenberg; Werner Stemer; Ralph Locher

(57) ABSTRACT

A charging device includes an electrically chargeable vehicle and a stationary charging station. In order to establish a galvanic connection between the vehicle and the charging station, the vehicle and the charging station each include at least two electrical contacts being in mutual contact for establishing the galvanic connection between the vehicle and the charging station. The contacts are each elongate. The contacts have specified lengths that are less than the width of the vehicle. The contacts of the vehicle are disposed in a fixed manner on the vehicle. The contacts of
(Continued)

the charging station are movable at least vertically. The mutually complementary contacts are disposed in such a way that the contacts extend transversely to each other in a predefined charging position of the vehicle for establishing of the galvanic connection.

7 Claims, 2 Drawing Sheets

(51) Int. Cl.
  *B60L 5/36* (2006.01)
  *B60L 53/16* (2019.01)
  *B60L 53/30* (2019.01)
  *B60L 53/35* (2019.01)

(52) U.S. Cl.
  CPC .............. *B60L 53/32* (2019.02); *B60L 53/35* (2019.02); *H02J 7/0027* (2013.01); *H02J 7/0045* (2013.01); *B60L 2200/18* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
  USPC ......................................................... 320/109
  See application file for complete search history.

(56) References Cited

U.S. PATENT DOCUMENTS

| | | | | |
|---|---|---|---|---|
| 4,357,501 A * | 11/1982 | Clerc | ................. | B60L 5/16 191/66 |
| 4,603,237 A * | 7/1986 | Ling | ................. | B60L 5/16 191/73 |
| 4,891,475 A * | 1/1990 | Wiersing | ............ | B60Q 1/1469 200/16 C |
| 5,272,431 A * | 12/1993 | Nee | ................. | B60L 3/0023 320/109 |
| 5,306,999 A * | 4/1994 | Hoffman | ............ | B60L 11/1818 320/109 |
| 5,344,330 A * | 9/1994 | Hoffman | ................. | B60L 50/66 439/138 |
| 5,464,082 A * | 11/1995 | Young | ................. | B60L 5/18 191/2 |
| 5,584,715 A * | 12/1996 | Ehrenfels | ............ | B60L 53/11 439/222 |
| 5,758,414 A * | 6/1998 | Ehrenfels | ............ | B60L 53/11 29/857 |
| 7,023,177 B1 * | 4/2006 | Bussinger | ........... | B60L 11/1816 320/109 |
| 7,986,125 B2 * | 7/2011 | Mitake | ................. | B60L 5/42 191/29 R |
| 8,138,718 B2 * | 3/2012 | Dower | ................. | B60L 11/1818 320/109 |
| 8,174,238 B2 * | 5/2012 | Badger | ................. | B60L 58/19 320/117 |
| 8,237,403 B2 * | 8/2012 | Ishii | ................. | B60R 16/04 320/112 |
| 8,324,858 B2 * | 12/2012 | Hill | ................. | B60L 5/42 320/109 |
| 8,373,389 B2 * | 2/2013 | Badger | ................. | B60L 11/1818 180/65.1 |
| 8,678,150 B2 * | 3/2014 | Andre | ................. | B60L 5/42 191/33 R |
| 8,742,721 B2 * | 6/2014 | Hama | ................. | H01M 10/46 320/116 |
| 8,794,410 B2 * | 8/2014 | Asplund | ................. | B60L 5/40 191/22 C |
| 8,829,853 B2 * | 9/2014 | Hill | ................. | B60L 5/42 320/109 |
| 9,168,839 B2 * | 10/2015 | Paupert | ................. | H02J 3/26 |
| 9,346,361 B2 * | 5/2016 | Francke | ................. | B60L 5/08 |
| 9,352,658 B2 * | 5/2016 | Morris | ................. | B60L 5/42 |
| 9,421,874 B2 * | 8/2016 | Warner | ............... | B60L 11/1835 |
| 9,446,672 B2 | 9/2016 | Hill et al. | | |
| 9,713,958 B2 * | 7/2017 | Buehs | ................. | B60L 5/28 |
| 9,718,367 B2 * | 8/2017 | McGrath | ................. | B60L 53/68 |
| 9,764,651 B2 * | 9/2017 | Moon | ................. | B60L 11/1818 |
| 9,809,122 B2 * | 11/2017 | McGrath | ................. | B60L 11/1818 |
| 9,908,435 B2 * | 3/2018 | Hill | ................. | B60L 5/42 |
| 9,994,431 B2 * | 6/2018 | Raabe | ................. | B60L 5/04 |
| 10,270,187 B2 * | 4/2019 | Morita | ............... | H01R 13/5213 |
| 2008/0221746 A1 | 9/2008 | Plishner | | |
| 2009/0121678 A1 * | 5/2009 | Mitake | ................. | B60L 5/42 320/109 |
| 2010/0039067 A1 * | 2/2010 | Hill | ................. | B60L 5/42 320/109 |
| 2010/0121509 A1 * | 5/2010 | Takeshima | ............... | B60K 1/00 701/22 |
| 2010/0308768 A1 * | 12/2010 | Dower | ................. | B60L 11/1818 320/109 |
| 2011/0181241 A1 * | 7/2011 | Badger | ............... | B60L 11/1818 320/109 |
| 2011/0181244 A1 * | 7/2011 | Badger | ............... | H01R 13/6315 320/117 |
| 2011/0227526 A1 * | 9/2011 | Hama | ................. | H01M 10/46 320/107 |
| 2012/0067684 A1 * | 3/2012 | Asplund | ................. | B60L 5/40 191/22 C |
| 2012/0111682 A1 | 5/2012 | Andre | | |
| 2012/0229085 A1 * | 9/2012 | Lau | ................. | B60L 11/1818 320/109 |
| 2012/0280656 A1 * | 11/2012 | Bedell | ................. | B60L 3/0069 320/109 |
| 2013/0076902 A1 * | 3/2013 | Gao | ................. | B25J 9/042 348/148 |
| 2013/0193919 A1 * | 8/2013 | Hill | ................. | B60L 5/42 320/109 |
| 2014/0002019 A1 * | 1/2014 | Park | ................. | B60L 11/00 320/109 |
| 2014/0070767 A1 * | 3/2014 | Morris | ................. | B60L 5/42 320/109 |
| 2014/0097054 A1 * | 4/2014 | Francke | ................. | B60L 5/08 191/59.1 |
| 2014/0340040 A1 * | 11/2014 | Hill | ................. | B60L 5/42 320/109 |
| 2015/0314695 A1 * | 11/2015 | McGrath | ................. | B60L 5/36 320/109 |
| 2015/0321563 A1 * | 11/2015 | Buehs | ................. | B60L 5/28 191/54 |
| 2016/0023564 A1 * | 1/2016 | Warner | ............... | B60L 11/1835 320/109 |
| 2016/0167532 A1 * | 6/2016 | Weigel | ............... | H01R 13/6315 320/109 |
| 2016/0185239 A1 * | 6/2016 | Weigel | ............... | H01R 13/6315 320/109 |
| 2016/0311336 A1 * | 10/2016 | Morris | ................. | B60L 5/42 |
| 2016/0362014 A1 * | 12/2016 | Hill | ................. | B60L 5/42 |
| 2017/0022033 A1 * | 1/2017 | Raabe | ................. | B60L 5/04 |
| 2017/0080813 A1 * | 3/2017 | Bedell | ................. | B60L 5/36 |
| 2017/0166071 A1 * | 6/2017 | Tajima | ................. | B60L 5/36 |
| 2017/0182898 A1 * | 6/2017 | McGrath | ................. | B60L 11/1818 |
| 2017/0210237 A1 * | 7/2017 | Buehs | ................. | B60L 53/14 |
| 2017/0217324 A1 * | 8/2017 | Buehs | ................. | B60L 11/1818 |
| 2017/0217334 A1 * | 8/2017 | Hill | ................. | B60L 5/42 |
| 2018/0248275 A1 * | 8/2018 | Morita | ............... | H01R 13/5213 |

FOREIGN PATENT DOCUMENTS

| | | |
|---|---|---|
| EP | 2504190 B1 | 3/2014 |
| GB | 2475703 A | 6/2011 |
| GB | 2526118 A | 11/2015 |
| WO | 2008107767 A2 | 9/2008 |
| WO | 2009014543 A1 | 1/2009 |
| WO | 2010003021 A2 | 7/2010 |
| WO | 2014207540 A2 | 12/2014 |
| WO | 2015173036 A1 | 11/2015 |

(56) References Cited

FOREIGN PATENT DOCUMENTS

OTHER PUBLICATIONS

Hellsing, Johan:"Mid-term Report "Report on 3 buses built""; URL:http://www.hyperbus.se/download/18.52b58bdf14510b15162b4bbb/1396356737933/Hyperbus-Report on 3 buses built-VolvoBus-JH,V1.pdf; XP055189897; 2013.

\* cited by examiner

CHARGING DEVICE FOR AN ELECTRICALLY CHARGEABLE VEHICLE

BACKGROUND OF THE INVENTION

Field of the Invention:

The invention relates to an electrically chargeable vehicle and a stationary charging station for charging the vehicle, wherein both the vehicle and the charging station have at least two electrical contacts each for establishing a galvanic connection between the vehicle and the charging station via mutual contact.

Charging devices having an electrically chargeable vehicle and a stationary charging station for charging the vehicle are known from the prior art. EP 2 504 190 B1 describes a charging station having a conductor rail which is divided into two parts in the transverse direction of the vehicle parked in a predefined parking position and has two poles and, therefore, two electrical contacts which are insulated from one another and lie on a shared longitudinal axis. Two interspaced collectors are arranged on the vehicle, each of which has two electrical contacts which extend parallel to each other in the transverse direction of the vehicle and are situated on the roof of the vehicle so as to be movable in the vertical direction relative to the vehicle. In order to charge the energy accumulator of the vehicle, the collector is moved toward the conductor rail and a galvanic connection is established.

For this purpose, the collectors comprise mechanics and corresponding drives, which results in an additional weight load on the vehicle and increases the loading gauge of the vehicle.

SUMMARY OF THE INVENTION

The problem addressed by the invention is that of providing a charging device which is cost-effective to manufacture and operate.

The problem is solved by the subjects of the independent claims. Refinements and embodiments of the invention are reflected in the features of the dependent claims.

A charging station according to the invention for a vehicle includes at least two electrical contacts for establishing electrical connections between the vehicle and the charging station via mutual contact with at least two complementary electrical contacts of the vehicle. Similarly, an electrically chargeable vehicle according to the invention includes at least two complementary electrical contacts for establishing the electrical connections between the vehicle and the charging station via mutual contact with the at least two electrical contacts of the charging station. Each contact pair consisting of an electrical contact of the charging station and its complementary electrical contact of the vehicle establishes an electrical connection, in particular. In particular, the mutually complementary electrical contacts touch each other and, in this way, form a galvanic connection between the charging station and the vehicle. In the case of two mutually complementary electrical contacts, therefore, two electrically conductive, galvanic connections will be established, via which electrical energy can be transferred from the charging station to the vehicle. The particular mutually complementary electrical contacts of the charging station and of the vehicle form the connection partner of the galvanic connection.

In addition, according to the invention, the charging station is designed in such a way that the electrical contacts thereof are movable at least vertically, wherein said contacts have lengths which are less than a width of the vehicle, and wherein at least one electrical contact of the charging station is arranged in such a way that said contact extends transversely to its complementary electrical contact of the vehicle in a predefined charging position of the vehicle.

The electrical contacts of the vehicle are fixedly arranged on the vehicle, however, wherein said contacts have lengths which are less than a width of the vehicle, and wherein at least one electrical contact of the vehicle is arranged in such a way that said contact extends transversely to its complementary electrical contact of the charging station in a predefined charging position of the vehicle.

According to one first refinement of the invention, the particular at least two electrical contacts of the charging station and of the vehicle are arranged in such a way that said contacts extend transversely to their particular complementary electrical contacts in a predefined charging position of the vehicle.

The electrical contacts of the charging station and/or of the vehicle are preferably elongate, wherein said contacts each have a predefined and limited length which is less than a width of the vehicle. Each electrical contact has a length and a width. The length thereof is greater than the width. Said contact is therefore considered to be elongate. The length thereof extends along a longitudinal axis. Each of the elongate contacts therefore has a longitudinal axis to be identified. Said contact is therefore elongate along the longitudinal axis thereof. Both the length as well as the width thereof are limited to a predefined dimension.

Said dimension is, in particular, less than the width of the vehicle in the region of the electrical contacts thereof. According to one embodiment, the length of an electrical contact of the vehicle is less than 80% of the width of the vehicle, in particular less than 50%. According to yet another embodiment, the length of an electrical contact of the charging station is likewise less than 80% of the width of the vehicle, in particular less than 50%. For example, all the electrical contacts of the charging station and/or of the vehicle have the same lengths. Depending on the orientation, the lengths can also vary, however.

In one refinement, each electrical contact comprises a contact face. Mutually complementary electrical contacts have, in particular, mutually complementary contact faces.

Advantageously, each contact face is planar. Each contact face lies in a predefined plane, in this case, and has a length and a width.

In order to establish a galvanic connection between the mutually complementary electrical contacts, said contacts touch each other. The mutual contact can take place, theoretically, at a point, for example, when the electrical contacts are shaped as wires and have a circular cross section. If the mutually complementary electrical contacts also lie in two mutually parallel planes and the projections of the longitudinal axes thereof intersect in a third, likewise parallel plane, then the mutually complementary electrical contacts touch each other at only one point. Technically, however, the mutually complementary electrical contacts contact each other in a planar manner. The corresponding contact faces are hereby in contact with each other.

Planar contact will therefore also be assumed in the following, or the invention will be explained in greater detail on the basis of planar contact faces, although the invention should not be limited thereto.

In order to compensate for a displacement of the vehicle from a predefined, ideal charging position in the direction of the longitudinal axis and/or transverse axis thereof, at least one electrical contact of the charging station extends extends transversely to its complementary electrical contact of the vehicle in the predefined charging position of the vehicle. In particular, all mutually complementary electrical contacts extend transversely to each other. For forming a galvanic connection in each case, the particular mutually complementary electrical contacts of the vehicle and of the charging station are arranged in such a way that the projections of the longitudinal axes thereof intersect in a projection plane parallel to the longitudinal axes or intersect perpendicularly in a predefined charging position of the vehicle. The horizontal roof of the vehicle can be, for example, a projection plane which lies, in particular, parallel to the corresponding longitudinal axes of the electrical contacts.

According to yet another refinement of the invention, the at least two electrical contacts of the charging station and/or the at least two electrical contacts of the vehicle lie in a shared plane in each case. This shared plane extends, in particular, horizontal or with a slight inclination.

The mutually complementary contact faces of the vehicle and of the charging station lie, in particular, in mutually parallel planes in each case; in one refinement, the planes are horizontal, and therefore the contacts faces of the vehicle and of the charging station extend horizontally in each case. A large-area, galvanic connection between the mutually complementary contact faces is established in this way.

The vehicle is an electrically operated vehicle, in particular an electrically driven vehicle. For example, the vehicle is used for public transportation, such as, e.g., an electric bus. The charging station, however, is connected to the surroundings thereof in a stationary manner. For example, said charging station is disposed at stops on the line network of the electric bus. The galvanic connection between the charging station and the vehicle is used primarily for charging energy accumulators of the vehicle.

The at least two contacts of the charging station and/or the at least two electrical contacts of the vehicle can each extend, lengthwise, perpendicular or parallel to each other.

According to one embodiment of the invention, the contact faces of the charging station and/or of the vehicle lie in a shared plane and extend, lengthwise, perpendicular or parallel to each other.

A refined vehicle and/or a refined charging station can also comprise four electrical contacts in each case, which lie in a shared plane in each case and are arranged, lengthwise, in the shape or a rectangle or a cross, or are parallel to each other.

If two electrical contacts extend, lengthwise, parallel to each other, their longitudinal axes extend parallel to each other. Similarly, the longitudinal axes thereof intersect perpendicularly when said axes extend, lengthwise, perpendicular to each other. The electrical contacts themselves do not necessarily need to intersect in this case. In one refinement, the electrical contacts of the vehicle and/or the electrical contacts of the charging station are insulated from each other. Said contacts are therefore free from overlap.

Four rectangularly arranged electrical contacts have two parallel longitudinal axes in each case, which are perpendicular to the two longitudinal axes of the further electrical contacts, wherein the longitudinal axes intersect at four points in such a way that said axes enclose a rectangle and form the sides of the rectangle. In particular, the electrical contacts are arranged in such a way that said contacts enclose a square. If four electrical contacts are arranged in the shape of a cross, two longitudinal axes of two electrical contacts coincide in each case and intersect at only one point. The electrical contacts which have a common longitudinal axis lie on different sides of the intersection point of their longitudinal axes in this case.

A charging device according to the invention comprises a stationary charging station according to the invention and at least one electrically chargeable vehicle according to the invention. In the predefined charging position of the vehicle, at least one electrical contact of the vehicle and at least one complementary electrical contact of the charging station for establishing the galvanic connection are arranged in such a way that said contacts extend transversely to each other. In particular, for establishing electrical connections, all mutually complementary contacts of the vehicle and of the charging station are arranged in such a way that said contacts extend transversely to each other in a predefined charging position of the vehicle.

Advantageously, four electrical contacts of the vehicle are arranged in the shape of a rectangle and four electrical contacts of the charging station are arranged in the shape of a cross. Conversely, the four electrical contacts of the vehicle can be arranged in the shape of a cross and the four electrical contacts of the charging station can be arranged in the shape of a rectangle.

In this way, the particular complementary contacts or the contact faces thereof for establishing the galvanic connection also overlap upon a displacement of the vehicle from its ideal, predefined charging position. The charging position can also be referred to as the parked position, since the vehicle is parked during charging.

Four electrical poles can be formed by means of four electrical contacts. The contacts or at least the contact faces thereof are produced from an electrically conductive material, for example, being produced from copper or graphite.

According to one refinement of the charging station, said charging station comprises a boom, by means of which the electrical contacts of the charging station are vertically movable. The electrical contacts are arranged, in this case, so as to be freely accessible from below, in particular, at one end which faces the ground. The boom can comprise a stationary frame and a side arm or a multiple-component arm, by means of which it is possible to move the electrical contacts in at least the vertical direction. In another embodiment, the contacts can be fastened on cables which are positioned by means of two or more controllable winches. A vertical axis of the vehicle also extends vertically in the predefined charging or parked position of the vehicle.

The boom can also be designed for moving the electrical contacts in the direction of the longitudinal axis of the vehicle and/or in the direction of the transverse axis of the vehicle. One advantage of the invention, however, is that the shape and arrangement of the electrical contacts or the contact faces thereof ensures that an orientation of the electrical contacts or the contact faces thereof in the direction of the longitudinal axis of the vehicle and/or in the direction of the transverse axis of the vehicle are/is not absolutely necessary upon a displacement of the vehicle, within a certain tolerance, from the predefined charging or parked position thereof in the transverse and/or longitudinal direction. The charging station can therefore be produced and operated easily and at low cost.

According to yet another refinement, it is provided that the electrical contacts of the vehicle are arranged on a roof of the vehicle so as to be freely accessible from above.

In order to charge a vehicle according to the invention by means of a charging station according to the invention, the following method steps are carried out:

moving the vehicle into a predefined region of the charging station, moving the electrical contacts of the charging station in the vertical direction relative to the vehicle, and establishing a galvanic contact between mutually complementary electrical contacts of the charging station and of the vehicle.

After completion of the charging process, the galvanic contact between the mutually complementary electrical contacts of the charging station and of the vehicle is released, the electrical contacts of the charging station are moved away from the vehicle in the vertical direction, and the vehicle is moved away from the predefined region of the charging station.

The galvanic contacts between the mutually complementary electrical contacts of the charging station and of the vehicle are established, in particular, by applying a predefined contact force. Said contact force acts, in particular, perpendiculary onto the contact faces.

The invention provides for numerous embodiments. The invention is described in greater detail with reference to the following figures, in each of which one exemplary embodiment is represented. Identical elements in the figures are provided with identical reference numbers.

DESCRIPTION OF THE INVENTION

Figure 1:
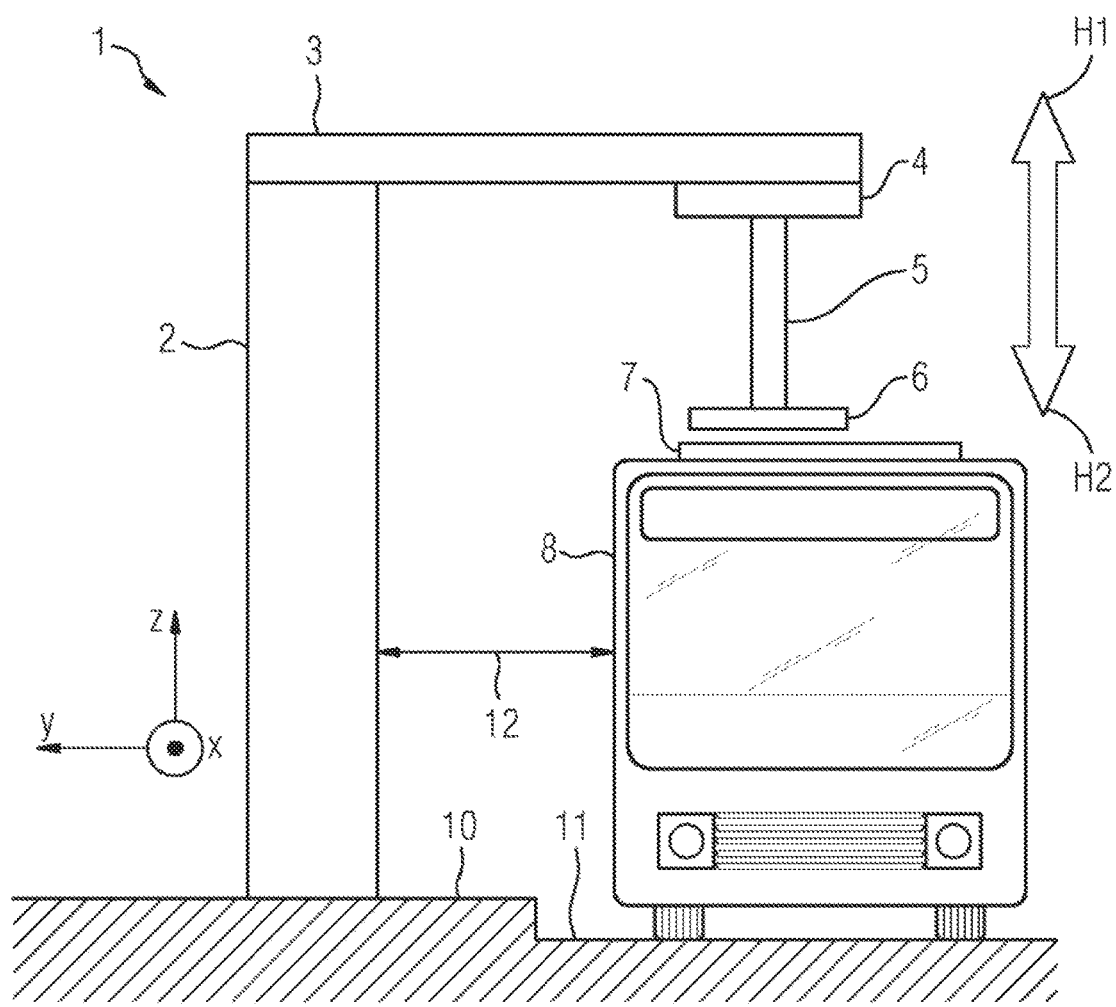
FIG. 1 schematically shows a charging device according to the invention.

FIG. 1 schematically shows a charging station 1 according to the invention from the side and a vehicle 8 according to the invention from the front.

The vehicle 8 is an electric bus for local public transportation, which comprises an electric drive and an energy accumulator for providing the electrical energy for the drive. The energy accumulator is chargeable. These comprise, for example, rechargeable batteries and/or capacitors.

A charging station 1 is provided for charging the energy accumulator of the vehicle 8. In addition to busses, other vehicles, for example, trucks or street cars, can also be charged at the charging station and can be designed according to the invention.

The charging station 1 is designed in the shape of a boom in this case and comprises a stationary frame 2 having a side arm 3 as a displaceable part of the charging station 1, which terminates above the roadway 11. The stationary frame 2 is rigidly anchored on the ground 10. The side arm in this case is an arm which has one or multiple components and can be moved about the x-axis and the y-axis. Said side arm comprises, at the end thereof remote from the frame 2, a plunger 5 which is connected via a joint 4 and has multiple electrical contacts on the end face 6 thereof facing the vehicle, for contacting complementary electrical contacts of the vehicle 8 on a roof of the vehicle facing the end face 6 of the plunger 5. The x-axis extends parallel to a longitudinal axis of the vehicle 8 in this case when the vehicle 8 is situated in a predefined, ideal charging position relative to the charging station 1. The z-axis is perpendicular to the roadway 11 in this case and, therefore, is also perpendicular to the x-axis. The y-axis extends horizontal in the direction of the transverse axis of the vehicle 8 in the predefined charging position.

The electrical contacts of the charging station 1 are vertically movable between an upper rest position H1 and a lower working position H2 and, therefore, with a directional component parallel to the vertical axis of the vehicle 8. Said contacts are lowered from the upper rest position H1 into the lower working position H2 for establishing a galvanic connection to the vehicle 8 and for charging the vehicle 8. Said contacts can be moved toward the vehicle 8 and can also be moved away from the vehicle 8. The complementary electrical contacts of the vehicle 8 are mounted in a predefined region 7 on the vehicle roof.

The embodiment of the mutually complementary electrical contacts described in the following makes it possible to compensate for the parked position of the vehicle 8 in the x-direction and the y-direction while requiring little space for the contacts on the vehicle roof and at the charging station 1. In this case, it is shown that the distance 12 of the vehicle 8 from the charging station 1 can be changed in the y-direction, within limits. There is a window, therefore, in the x-direction and the y-direction around the predefined, ideal parked position of the vehicle 8, in which the vehicle 8 can be parked without influencing the quality of the contacting. The vehicle 8 is at a standstill during the charging thereof at the charging station 1.

Figure 2:
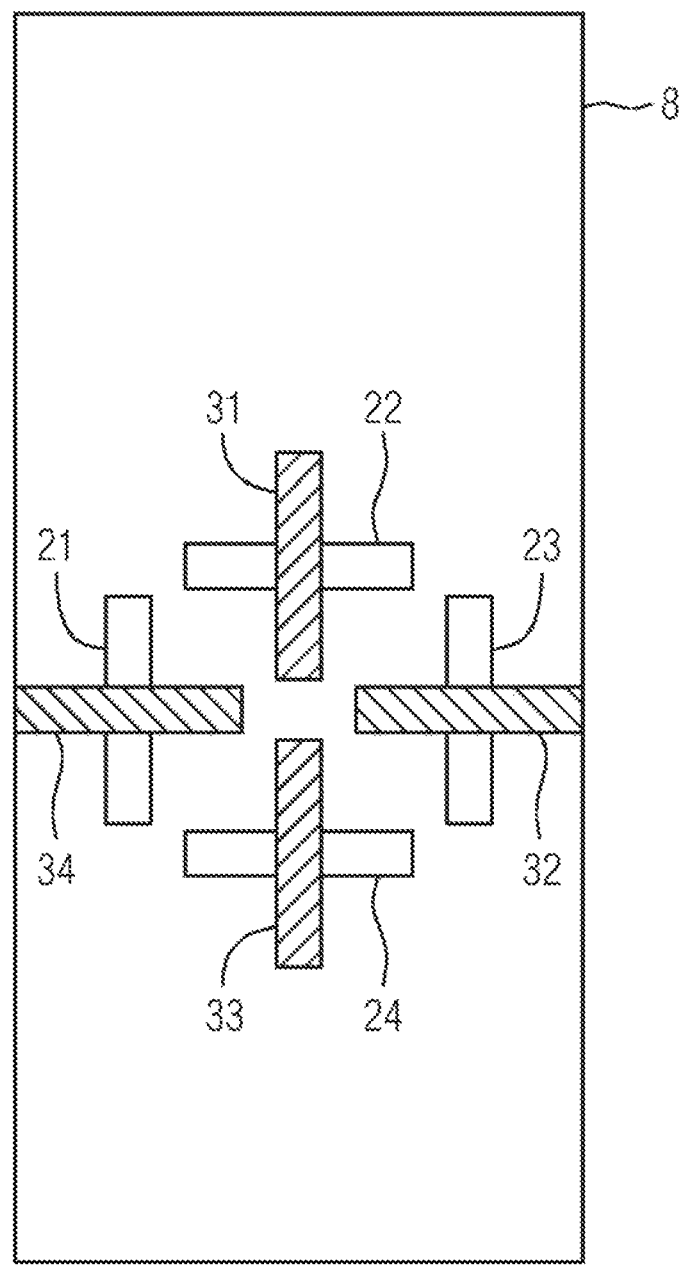
FIG. 2 shows a part section through a charging station according to the invention in contact with a vehicle according to the invention.

FIG. 2 illustrates the shape and the arrangement of the electrical contacts 31-34 and 21-24 of the charging station and of the vehicle 8. As described above, the charging station comprises at least two electrical contacts 31, 32, 33 and 34 for establishing a galvanic connection to the vehicle. Similarly, the vehicle 8 comprises at least two electrical contacts 21, 22, 23 and 24 for establishing the galvanic connection to the charging station. In this exemplary embodiment, both the vehicle 8 and the charging station comprise four electrical contacts 21-24 and 31-34, respectively, which are complementary to each other in pairs.

The electrical contacts 21-24 and 31-34 themselves can have many geometric shapes. In this case, said contacts are each rectangular and are insulated from each other. The particular contact faces of the electrical contacts are apparent in the top view of the vehicle roof from above, which is shown here. The length thereof is limited, but it is still substantially greater than the width thereof in each case. Said contact faces are therefore elongate and have a longitudinal axis, in each case, which is not indicated, for the sake of clarity. The minimum length thereof is, in particular, at least approximately 20% of the width of the vehicle 8 in the region of the contact faces of the electrical contacts 21-24 in each case.

The lengths of the contact faces of the electrical contacts 21, 23, 31 and 33, which extend in the x-direction, establish how far away from the predefined parked position, in the x-direction, the vehicle 8 can be parked underneath the charging station without affecting the contacting for charging. Similarly, the lengths of the contact faces of the electrical contacts 22, 24, 32 and 34, which extend in the y-direction, establish how far away from the predefined parked position, in the y-direction, the vehicle 8 can be parked underneath the charging station without affecting the contacting for charging.

The contact faces of the electrical contacts 21-24 of the vehicle 8 lie in a horizontal plane and are arranged, lengthwise, in a rectangle and are electrically insulated from each other. Said contact faces are fixedly connected to the vehicle. The contact faces of the electrical contacts 31-34 of the charging station likewise lie in a horizontal plane and are arranged, lengthwise, in the shape of a cross and are electrically insulated from each other. The arrangement of the contact faces of the electrical contacts 21-24 and 31-34 on the vehicle 8 and on the charging station are exchangeable, i.e., a reversed arrangement is also possible. Since the contact faces of the electrical contacts 21-24 and 31-34 are arranged, lengthwise, in the shape of a cross and a rectangle, the particular longitudinal axes thereof intersect at one point, in each case, and at four points. Since the mutually complementary contact faces of the electrical contacts 21-24 and 31-34 lie in parallel planes, said contact faces touch each other in a planar manner.

The electrical contacts 21 and 34, 22 and 31, 23 and 32, 24 and 33, which are mutually complementary in pairs in each case, of the charging station and of the vehicle 8 for establishing the galvanic connections are oriented perpendicular to each other in the predefined parked position of the vehicle 8. The longitudinal axes thereof intersect in the top view. Said axes not only touch each other at least at one point, but rather their contact faces are superimposed here in an overlapping manner. The vehicle and the charging station are designed accordingly. The electrical contact 21 forms the contact partner, on the vehicle, for the electrical contact 34 of the charging station, and vice versa; similarly, the electrical contacts 22 and 31, 23 and 32, 24 and 33 form the particular contact partners for establishing galvanic connections via mutual contact.

In the top view, the particular mutually complementary electrical contacts 21 and 34, 22 and 31, 23 and 32, 24 and 33 cross over each other; the mutually complementary contact faces cross over each other lengthwise.

By means of the invention, it is possible to minimize the size and the weight of the contact device on the vehicle and to establish a secure electrical contact thereof for two or more—four, in this case—poles between the charging station and the vehicle, in fact, without any moving parts on the vehicle. The resultant lower weight of the vehicle results in reduced fuel consumption and lower maintenance costs. There is no need to equip a fleet of vehicles with pantographs, but rather only a reasonable number of charging stations. The size of the electrical contacts and the contact faces thereof can be kept relatively low without unreasonably increasing the requirements on parking accuracy, since a high tolerance for the parked position has been made possible.

The invention claimed is:

1. A charging station for a vehicle, the charging station comprising:
   four electrical contacts of the charging station for establishing electrical connections between the vehicle and the charging station by mutual contact between said four electrical contacts of the charging station and four complementary electrical contacts of the vehicle;
   said four electrical contacts of the charging station being movable at least vertically;
   said four electrical contacts of the charging station having lengths being less than a width of the vehicle;
   said four electrical contacts of the charging station and the four complementary electrical contacts of the vehicle each having a respective longitudinal axis;
   said longitudinal axes of said four electrical contacts of the charging station each being oriented transversely to a respective one of the longitudinal axes of the four complementary electrical contacts of the vehicle and said longitudinal axes of said four electrical contacts of the charging station each intersecting a respective one of the longitudinal axes of the four complementary electrical contacts of the vehicle at one respective point in a predefined charging position of the vehicle;
   said four electrical contacts of the charging station lying in a shared plane and being disposed lengthwise; and
   said longitudinal axes of said four electrical contacts of the charging station together forming a rectangular shape or together forming a cross shape.

2. The charging station according to claim 1, wherein said shared plane is a horizontal plane.

3. The charging station according to claim 1, which further comprises a boom of the charging station for vertically moving said four contacts of the charging station.

4. An electrically chargeable vehicle, comprising:
   four electrical contacts of the vehicle for establishing electrical connections between the vehicle and the charging station by mutual contact with four complementary electrical contacts of a charging station;
   said four electrical contacts of the vehicle being fixedly disposed on the vehicle;
   said four electrical contacts of the vehicle having lengths being less than a width of the vehicle;
   the four electrical contacts of the charging station and said four complementary electrical contacts of the vehicle each having a respective longitudinal axis;
   said longitudinal axes of said four electrical contacts of the vehicle each being oriented transversely to a respective one of the longitudinal axes of the four complementary electrical contacts of the charging station and said longitudinal axes of said four electrical contacts of the vehicle each intersecting a respective one of the longitudinal axes of the four complementary electrical contacts of the charging station at one respective point in a predefined charging position of the vehicle;
   said four electrical contacts of the vehicle lying in a shared plane and being disposed lengthwise; and
   said longitudinal axes of said four electrical contacts of the vehicle together forming a rectangular shape or together forming a cross shape.

5. A charging device, comprising:
   a charging station according to claim 1; and
   a vehicle according to claim 4.

6. The vehicle according to claim 4, wherein said shared plane is a horizontal plane.

7. The vehicle according to claim 4, wherein said four electrical contacts of the vehicle are disposed on a roof of the vehicle and are freely accessible from above.

* * * * *